United States Patent
Mitchell et al.

(10) Patent No.: US 12,432,237 B2
(45) Date of Patent: Sep. 30, 2025

(54) IDENTIFICATION AND INSPECTION OF OUTLIER DOMAIN NAME SYSTEM REQUESTS

(71) Applicant: HYAS Infosec Inc., Vancouver (CA)

(72) Inventors: David J. Mitchell, Danville, CA (US); Paul C. van Gool, Santa Barbara, CA (US)

(73) Assignee: HYAS Infosec Inc., Vancouver (CA)

( * ) Notice: Subject to any disclaimer, the term of this patent is extended or adjusted under 35 U.S.C. 154(b) by 304 days.

(21) Appl. No.: 18/173,024

(22) Filed: Feb. 22, 2023

(65) Prior Publication Data

US 2024/0283804 A1 Aug. 22, 2024

(51) Int. Cl.
*H04L 9/40* (2022.01)
*H04L 61/4511* (2022.01)

(52) U.S. Cl.
CPC ...... *H04L 63/1425* (2013.01); *H04L 61/4511* (2022.05); *H04L 63/1416* (2013.01)

(58) Field of Classification Search
CPC ............. H04L 63/1425; H04L 61/4511; H04L 63/1416
See application file for complete search history.

(56) References Cited

U.S. PATENT DOCUMENTS

| | | | | |
|---|---|---|---|---|
| 8,997,227 | B1 * | 3/2015 | Mhatre | H04L 63/1416 726/23 |
| 10,362,057 | B1 * | 7/2019 | Wu | H04L 63/1408 |
| 2013/0117282 | A1 * | 5/2013 | Mugali, Jr. | H04L 63/1441 707/748 |
| 2015/0180892 | A1 * | 6/2015 | Balderas | H04L 61/4511 726/22 |
| 2016/0308739 | A1 * | 10/2016 | Benjamin | H04L 63/0227 |
| 2018/0027013 | A1 * | 1/2018 | Wright | H04L 61/4511 726/23 |
| 2024/0223583 | A1 * | 7/2024 | Pasini | H04L 63/1416 |
| 2024/0333755 | A1 * | 10/2024 | Rodriguez | H04L 63/1441 |

* cited by examiner

*Primary Examiner* — Brian Whipple

(57) ABSTRACT

The technology disclosed herein enables identification of outlier DNS requests so the identified requests can be inspected to determine whether the identified requests may be associated with suspicious activity. In a particular example, a method provides determining characteristics of a Domain Name System (DNS) request and generating a score for the DNS request from the characteristics. The method further provides grouping a plurality of DNS requests into one or more groups based on a plurality of DNS request scores for the plurality of DNS requests. The plurality of DNS requests occurred in a specified timeframe and include the DNS request. The plurality of DNS request scores includes the score. In response to determining the DNS request is an outlier relative to the one or more groups, the method provides inspecting the DNS request for anomalies.

18 Claims, 6 Drawing Sheets

IDENTIFICATION AND INSPECTION OF OUTLIER DOMAIN NAME SYSTEM REQUESTS

TECHNICAL BACKGROUND

The Domain Name System (DNS) allows a computing system to contact another computing system over the internet using a domain name rather than using the other system's network address. DNS nameservers receive requests for network addresses associated with domain names and identify network addresses that correspond to the respective domain names. A computing system requesting a domain name resolution uses a network address supplied by a nameserver to contact a destination computing system (e.g., web server) associated with the domain name and having the supplied network address. Typically, the requesting computing system, or other components of a network in which the requesting computing system is located, has no reason not to trust the destination computing system. The requesting computing system can, therefore, proceed to communicate with the destination system. However, it is possible that the destination computing system may be configured for undesirable activity. Even if consequences of that undesirable activity are detected on the requesting system or within the requesting system's network, it may be difficult to find the cause.

SUMMARY

The technology disclosed herein enables identification of outlier DNS requests so the identified requests can be inspected to determine whether the identified requests may be associated with suspicious activity. In a particular example, a method provides determining characteristics of a Domain Name System (DNS) request and generating a score for the DNS request from the characteristics. The method further provides grouping a plurality of DNS requests into one or more groups based on a plurality of DNS request scores for the plurality of DNS requests. The plurality of DNS requests occurred in a specified timeframe and include the DNS request. The plurality of DNS request scores includes the score. In response to determining the DNS request is an outlier relative to the one or more groups, the method provides inspecting the DNS request for anomalies.

In another example, an apparatus is provided having one or more computer readable storage media and a processing system operatively coupled with the one or more computer readable storage media. Program instructions stored on the one or more computer readable storage media, when read and executed by the processing system, direct the apparatus to perform the steps of the above-recited method.

DETAILED DESCRIPTION

The DNS resolver herein monitors and scores DNS requests based on characteristics of the DNS requests. The DNS resolver uses the scores to group the DNS requests. DNS requests that do not fit into a particular group are considered outlier DNS requests, which may warrant further inspection. For example, malicious activity may be identified on a computing network. To determine from where the malicious activity initiated, a system administrator may request inspection of outlier DNS requests to determine whether any of those requests have anomalies (e.g., characteristics indicating the request may be associated with malicious activity). For instance, the inspection may indicate that the network address supplied in response to an outlier DNS request is assigned to a destination system in a suspicious geographic location or that a nameserver used when resolving the DNS request was not a typical nameserver associated with a domain name in the DNS request (e.g., the domain name may have been hijacked). Depending on the results of the inspection, the network administrator may take action to remedy the malicious activity (e.g., create a firewall rule, remove malicious processes, etc.).

Figure 1:
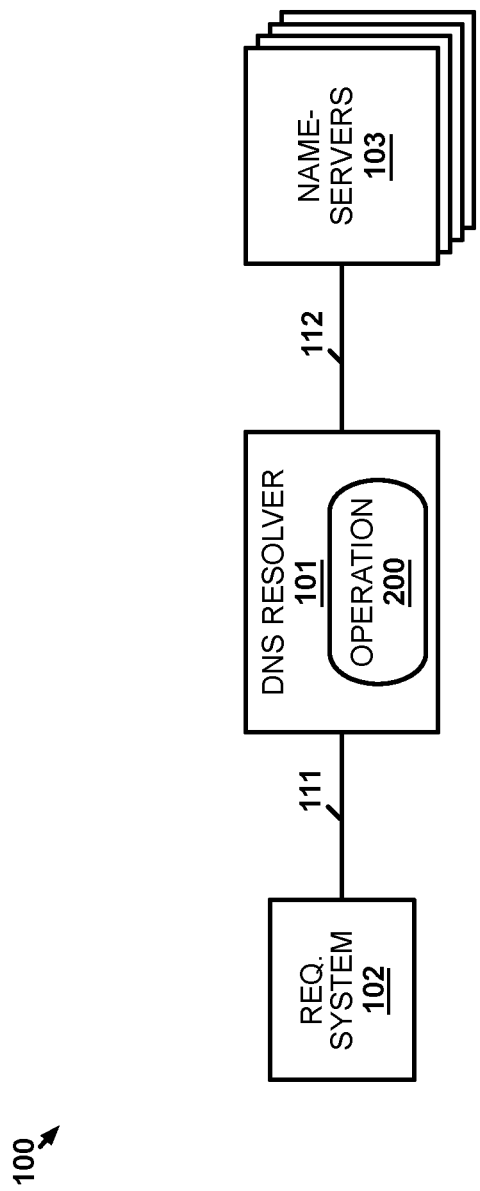
FIG. 1 illustrates an implementation for identifying and inspecting outlier DNS requests.

FIG. 1 illustrates implementation 100 for identifying and inspecting outlier DNS requests. Implementation 100 includes DNS resolver 101, requesting computing system 102, and nameservers 103. DNS resolver 101 and requesting computing system 102 communicate over communication link 111. DNS resolver 101 and nameservers 103 communicate over communication links 112. Communication links 111-112 are shown as direct links but may include intervening systems, networks, and/or devices.

In operation, DNS resolver 101 is a computing system that resolves network addresses associated with domain names on behalf of requesting systems, such as requesting computing system 102. DNS resolver 101 may be positioned in a network so as to service all DNS requests for computing systems in the network or computing systems, regardless of whether they are in the same network, may be otherwise directed to use DNS resolver 101 to resolve DNS requests. Nameservers 103 are nameservers of the global DNS and include records, commonly referred to as A records, of network addresses associated with respective domain names. For redundancy, at least two of nameservers 103 are typically used to keep network address records for any given domain name. A conventional DNS resolver simply identifies and retrieves a network address from one of the nameservers associated with a domain name in a DNS request to resolve the DNS request. DNS resolver 101 further performs operation 200 described below to identify outlier DNS requests and inspect the outlier DNS requests for anomalies.

While operation 200 is described as occurring in DNS resolver 101, operation may be performed in a different system having access to DNS request characteristics. For example, a system in the communication path of DNS requests sent from requesting computing system 102, such as a router or a firewall, may perform operation 200. Alternatively, a system in the communication path may forward information about the DNS requests and responses thereto (or the requests/responses themselves) to a system performing operation 200.

Figure 2:
FIG. 2 illustrates an operation to identify and inspect outlier DNS requests.

FIG. 2 illustrates operation 200 to identify and inspect outlier DNS requests. During operation 200, DNS resolver 101 determines characteristics of a DNS request (201). The DNS request in this example is received from requesting computing system 102. The DNS request includes a domain name for which requesting computing system 102 is requesting a corresponding network address. Requesting computing system 102 may be a user system (e.g., telephone, laptop, personal computer, tablet computer, or some other type of user operable computing system) or may be another type of computing system capable of using DNS requests to request network addresses associated with domain names. Requesting computing system 102 may address the DNS request directly to DNS resolver 101 or, if the DNS request is directed to a different DNS resolver (e.g., a DNS resolver in an internet service provider of requesting computing system 102), then an intermediate system (e.g., network firewall) may redirect the DNS request to DNS resolver 101. The DNS request may be transmitted to DNS resolver 101 in response to a user of requesting computing system 102 directing a web browser application executing on requesting computing system 102 to a particular website using a domain name for that website (e.g., the user may enter a Uniform Resource Locator (URL) with the domain name into the web browser). Although, other reasons that requesting computing system 102 may submit a DNS request also exist (e.g., a database system may be identified to an application on requesting computing system 102 using a URL with a domain name).

The characteristics of the DNS request include one or more characteristics describing, or including information associated with, the request or a response thereto from nameservers 103. The characteristics may include a network address of a nameserver to which DNS resolver 101 directs the DNS request. In some examples, multiple nameservers will be used (e.g., different levels of nameservers may need to be traversed to resolve the destination network address requested by the DNS request) and network addresses for any or all of those nameservers may be included in the characteristics. The characteristics may further include a geographic location(s) (e.g., country, region, state, city, etc.) of a nameserver(s) having the network address(es) described above, a network address of requesting computing system 102 that generated the DNS request, a domain name indicated by the DNS request for resolution into a destination network address by nameservers 103, the destination network address resolved by nameservers 103 in response to the DNS request, a geographic location of a system having the destination network address, or some other type of information related to the DNS request—including combinations thereof. The characteristics may be stored by DNS resolver 101 with an indication of with which DNS request the characteristics are associated so that the particular DNS request having the characteristics can be identified later. Similarly, DNS resolver 101 may store a copy of the actual request and/or response thereto.

DNS resolver 101 generate a score for the DNS request from the characteristics (202). The score may be generated upon receiving a request requiring the score, such as a request for the grouping described below, or may be generated at another time (e.g., at substantially the same time when the characteristics are determined). The score may be an aggregation (e.g., a sum, average, or other type of combination) of arbitrary values given to different characteristics. For instance, one geographic region may be assigned one arbitrary value while another region may be assigned a different arbitrary value. While the value itself may be arbitrary, the fact that the values are different enables the score for a DNS request associated with one region to differ from (and, therefore, not necessarily be grouped with) the score for a DNS request associated with another region. In some examples, the values assigned to certain characteristics may differ (e.g., be weighted differently) depending on the nature of the characteristic. Again, using geographic regions as an example, geographic regions that are less known for malicious activity stem therefrom may receive a low value for inclusion in the score (and different regions may be assigned the same value) while regions know for more malicious activity may receive higher score values (e.g., with a most risky region being assigned the highest value). In some examples, the score may start at a particular value and then that starting value may be added to or subtracted from by the values assigned to each of the characteristics. In such examples, the values may be negative. The values that should be assigned to each characteristic may be defined by a human administrator, may be defaults included in DNS resolver 101, may be determined by a machine learning algorithm, or may be provided in some other manner-including combinations thereof. In some examples, two or more scores may be generated for a single DNS request. For example, a first score may be generated based on characteristics related to the DNS request itself and a second score may be generated based on characteristics related to a response to the DNS request. Of course, other conventions for divvying up which characteristics should be included in which score may be used instead. Multiple scores enable the DNS request to be plotted over multiple axis when being grouped with other DNS requests based on the scores.

As alluded to above, DNS resolver 101 groups the DNS request into one or more groups along with other DNS requests for which DNS resolver 101 generated scores based on the scores for the respective DNS requests (203). DNS resolver 101 limits the number of DNS requests that are considered for grouping based on a specified timeframe (e.g., DNS requests that were handled over a particular two-day period). The timeframe may be specified by an administrative user or may be received from some other source. For instance, an administrator may determine that undesirable activity has been detected within a network/systems served by DNS resolver 101. The administrator may determine that the activity likely started during a particular timeframe (e.g., a firewall may report that anomalous activity started in the timeframe). The administrator may then query DNS resolver 101 to group DNS requests during the timeframe to identify any outliers that should be subject to further inspection. As such, DNS resolver 101 tracks when each of the DNS requests are handled and, in some examples, the time may be included in the characteristics upon which the scores are determined. DNS resolver 101 may apply one or more thresholds to the scores to determine whether a DNS request should be considered part of a group or considered an outlier. For example, a threshold may indicate that all scores with a less than 5% difference should be considered a group. A machine learning algorithm may also be trained to recognize grouped requests. For instance, example scores may be plotted for a user and the user may indicate which scores should be grouped to the algorithm and the algorithm may learn how to group from the user's indications.

It should be understood that DNS resolver 101 is not grouping the actual DNS request messages but, rather, groups them in a representative sense based on their scores. By the time DNS resolver 101 groups the DNS requests, the DNS requests have likely been handled already. Although, DNS resolver 101 may store a copy of the DNS requests along with information about the DNS requests' characteristics used for generating the scores.

After grouping the DNS requests, DNS resolver 101 determines whether there are any DNS requests that are outliers relative to the one or more groups created by DNS resolver 101 (204). An outlier DNS request is a request that was not included in the groups resulting from the grouping performed by DNS resolver 101. The outlier DNS request may be a single request or itself may be grouped with one or more other DNS requests. A threshold for the number of requests may be used to determine that two or more requests are outliers rather than simply a different group. For example, the threshold may indicate that a grouping of any less than a certain number of DNS requests (e.g., less than 5) is considered to be a grouping of outliers.

In this example, the DNS request from requesting computing system 102 is determined to be an outlier. Responsive to that determination, DNS resolver 101 inspects the DNS request for anomalies (205). The inspection may involve DNS resolver 101 identifying systems assigned the network addresses in the characteristics and reaching out to those systems for additional information, scrutinizing the characteristics themselves in more depth (e.g., determining whether a nameserver used to resolve the DNS request is typical for the domain name in the request), or may perform some other action to determine whether something related to a DNS request is anomalous. In one example, DNS resolver 101 determines that a host posture for requesting computing system 102, which generated the DNS request. The host posture may indicate what security mechanisms have been implemented on requesting computing system 102 and may further indicate how those mechanisms are configured. From the host posture information, DNS resolver 101 may determine whether requesting computing system 102 could be the source of other anomalous activity (e.g., the malicious activity identified by the administrator in the above example). In some examples, DNS resolver 101 may be able to identify the host posture of other systems involved in the handling of the DNS request, such as a destination system associated with the network address returned in the response or a nameserver. While DNS resolver 101 is itself shown to be handling the inspection of the DNS request, a different system may perform the inspection than the system that performed the grouping.

Advantageously, even though a DNS request was already handled without being blocked or otherwise flagged as being anomalous, DNS resolver 101 can identify that request as being an outlier at a later time. Subjecting the request to later inspection can still be beneficial to troubleshooting malicious or other type of undesired activity by potentially pointing to the origins of the activity (e.g., the DNS request may have resulted in contacting a server that supplied malware).

Figure 3:
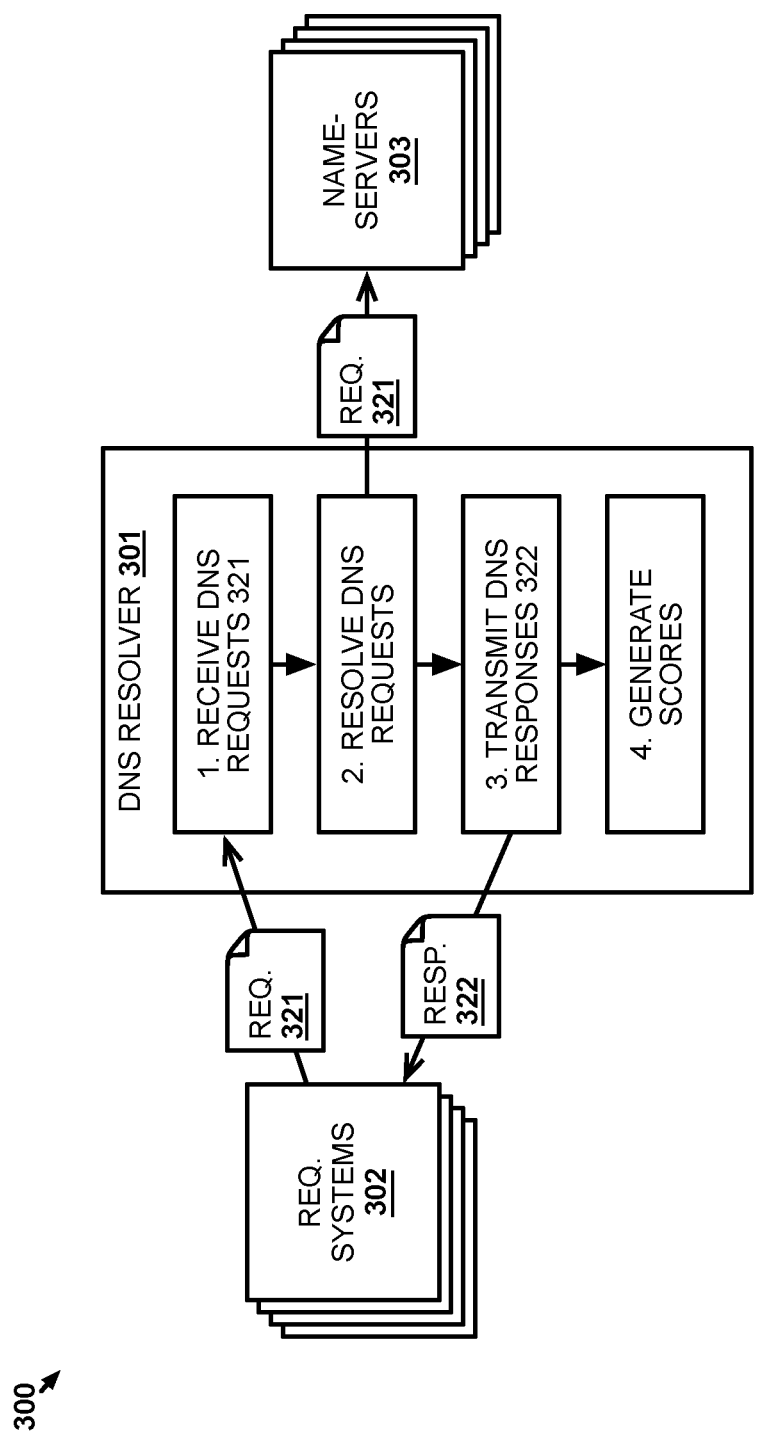
FIG. 3 illustrates an operational scenario for identifying and inspecting outlier DNS requests.

FIG. 3 illustrates operational scenario 300 for identifying and inspecting outlier DNS requests. Operational scenario 300 includes DNS resolver 301, requesting systems 302, and nameservers 303. DNS resolver 301 is an example of DNS resolver 101 and nameservers 303 are examples of nameservers 103. Requesting computing system 102 is an example of one of requesting systems 302. In operational scenario 300, DNS resolver 301 receives DNS requests 321 at step 1 from requesting systems 302. As each of DNS requests 321, DNS resolver 301 passes the request to requesting systems 302 at step 2 to resolve the request. DNS responses 322 to the requests that include the destination network addresses resolved by nameservers 103 are transmitted back to requesting systems 302 at step 3. DNS requests 321 are likely not all received at once but are received over time as requesting systems 302 request network addresses for various domain names. Steps 2 and 3 are performed as each of DNS requests 321 is received so that each request can be handled in substantially real time. While DNS resolver 301 is shown as passing DNS requests 321 unchanged to nameservers 303, in some examples, DNS resolver 301 may generate a new nameserver request for each of DNS requests 321 and transmit those nameserver requests instead.

From DNS requests 321 and DNS responses 322, DNS resolver 301 collects characteristics associated with DNS requests 321 and generates a score for each of DNS requests 321 at step 4. In this example, the scores are generated prior to any request that may use the scores, which may save processing time when such a request comes. Like steps 2 and 3, step 4 may occur whenever a new request/response is handled by DNS resolver 301. Other examples may wait until a request to use the score is received. The characteristics may be explicit in DNS requests 321 and DNS responses 322 (e.g., a network address listed in one of DNS responses 322 or a network address of a requesting system), DNS resolver 301 may derive the characteristic from explicit information, or DNS resolver 301 may reference other systems to determine the characteristics. For example, a nameserver's network address may be used by DNS resolver 301 to determine the nameserver's geographic location. After generating the scores, DNS resolver 301 stores each score in association with the score's corresponding DNS request. The characteristics also remain stored in association with the DNS request such that the characteristics can be subject to further inspection. DNS resolver 301 may be configured to delete information (i.e., scores, characteristics, etc.) when a DNS request is exceeds a threshold age (e.g., over one year old) or when storage limitations are reached. Preferably, DNS resolver 301 keeps the information for the DNS requests at least until it is unlikely that further inspection of the DNS request will be performed (e.g., after any anomalous activity stemming from the DNS request would likely have already been detected).

Figure 4:
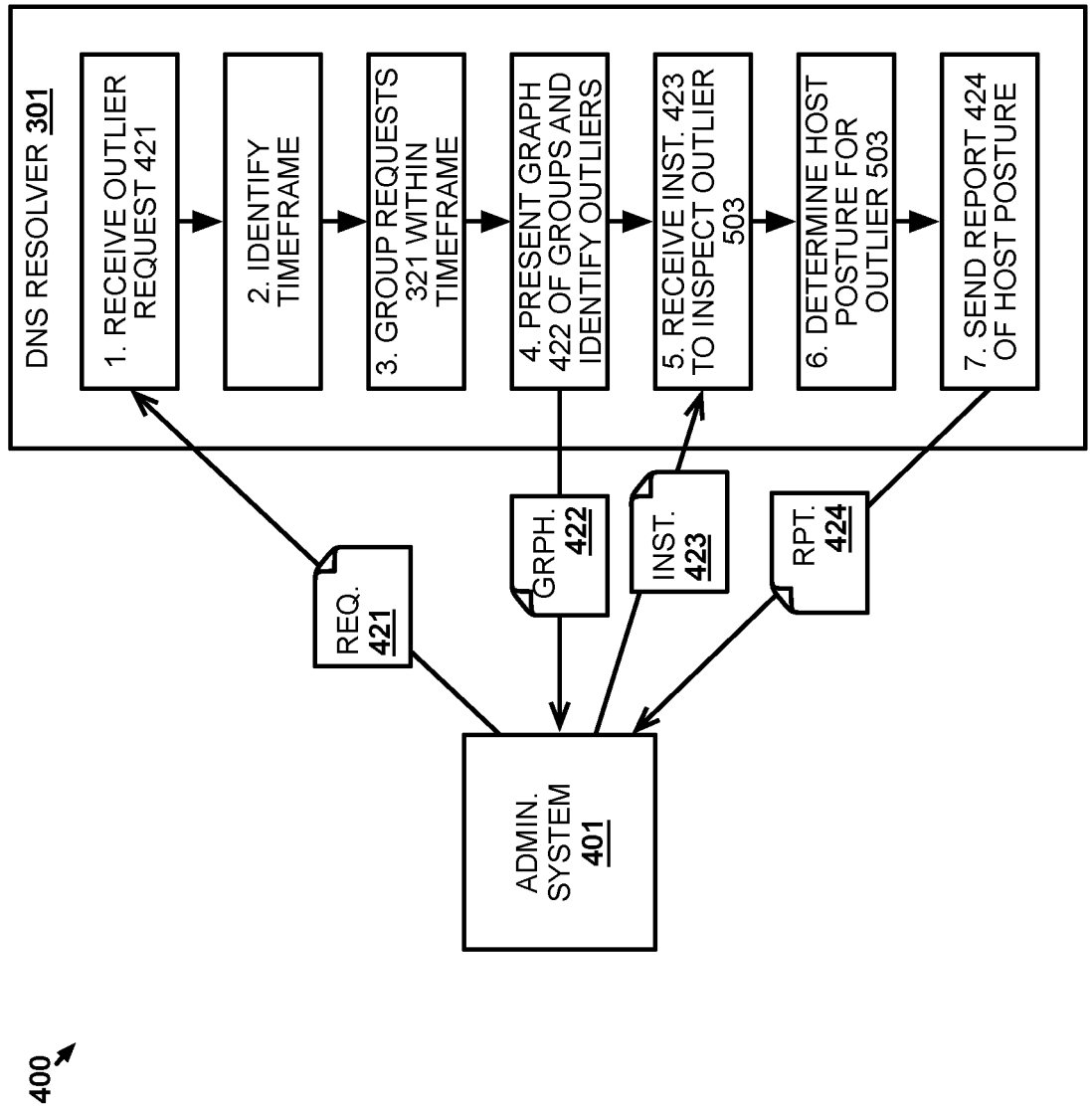
FIG. 4 illustrates an operational scenario for identifying and inspecting outlier DNS requests.

FIG. 4 illustrates operational scenario 400 for identifying and inspecting outlier DNS requests. Operational scenario 400 also involves DNS resolver 301 and occurs after operational scenario 300. Although, operational scenario 300 may continue to be performed for subsequent DNS requests received from requesting systems 302. In operational scenario 400, DNS resolver 301 receives outlier request 421 at step 1 from administrator system 401, which is a user system operated by a user. The user may be an administrative user tasked with managing operations (e.g., security, configuration, etc.) of requesting systems 302 and the networks to which requesting systems 302 are connected. Administrator system 401 may itself be one of requesting systems 302. Outlier request 421 is transmitted to DNS resolver 301 by administrator system 401 at the direction of the user of administrator system 401. Administrator system 401 may present a user interface to its user enabling the user to trigger transmission of outlier request 421 and define parameters of outlier request 421 (e.g., define the timeframe discussed below). The user interface may be presented at the direction of a client application executing on administrator system 401, may be presented in a web browser of administrator system 401, or may be presented using some other mechanism. Regardless of how administrator system 401 is directed to transmit outlier request 421, outlier request 421 is transmitted in a format readable by DNS resolver 301. While outlier request 421 is received from administrator system 401 in this example, DNS resolver 301 may include its own user interface for interaction with users in other examples.

Outlier request 421 indicates a timeframe of interest to the user and DNS resolver 301 identifies the timeframe at step 2. The timeframe may be received in administrator system 401 from a user before being included in outlier request 421 for transmission to DNS resolver 301. The timeframe could be any period of time in which DNS requests may have been received. In some cases, the timeframe may not be contiguous (e.g., the timeframe may include only nighttime hours over the course of a week). In this example, the timeframe is a timeframe that the user of administrator system 401 has determined to be of interest. For instance, the user may have identified anomalous or malicious activity on a network connecting requesting systems 302 and, based on characteristics of that activity, may estimate a period of time in which the malicious activity was likely to have been initiated. The timeframe may be selected by the user to include that estimated period of time.

After identifying the timeframe, DNS resolver 301 groups those of DNS requests 321 that occurred within the timeframe at step 3 based on the scores generated for the requests in operational scenario 300. While the groups need not be visualized in all examples, at step 4 DNS resolver 301 presents graph 422 of the DNS requests and identifies any outlier DNS requests thereon. To present graph 422, DNS resolver 301 may transmit graph 422 to administrator system 401 for display thereat (e.g., in the same user interface through which the user directed administrator system 401 to send outlier request 421). In other examples, DNS resolver 301 may provide a report of the DNS requests that it found to be outliers (e.g., a report that identifies an outlier request and provides relevant characteristics of the request).

Figure 5:
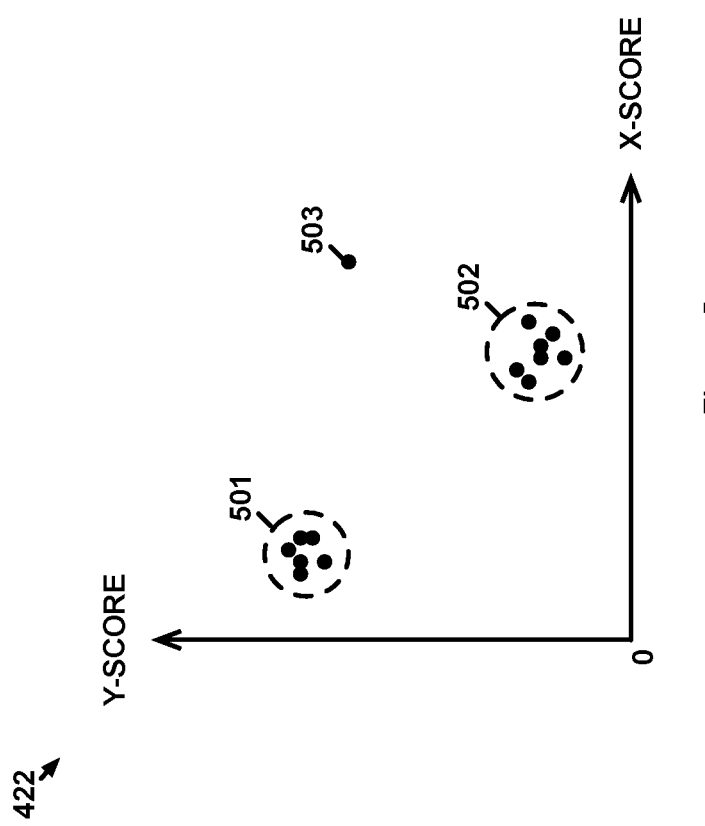
FIG. 5 illustrates a graph of DNS requests to identify and inspect outlier DNS requests.

FIG. 5 illustrates graph 422 of DNS requests to identify and inspect outlier DNS requests. Graph 422 is an example of what may be presented by administrator system 401. In examples, where a graph is not presented, graph 422 can be viewed as a mere visualization of the grouping performed by DNS resolver 301. In this example, two scores, an X-score and a Y-score in accordance with their respective axes, are determined for each DNS request (e.g., one portion of the characteristics may be used to generate the X-score while another portion of the characteristics may be used to generate the Y-score). The scores both start at 0 and increase from there, although, other examples may allow for negative scores. Each DNS request (represented by a dot) is plotted on graph 422 in the position that corresponds to both of the request's scores. As shown, DNS resolver 301 determined that most of the DNS requests in the specified timeframe fall within group 501 and group 502. Outlier DNS request 503 did not satisfy criteria for inclusion in group 501 or group 502, nor did it satisfy criteria for inclusion in its own group. As noted above, DNS resolver 301 indicates graph 422 which DNS requests are outliers. In this case, since outlier DNS request 503 is not encircled as being included in a group, that lack of encirclement is the indication. In other examples, DNS resolver 301 may highlight outlier requests (e.g., present a different ring around outlier requests), may use a different color for the dots representing outlier requests, or may use some other mechanism to indicate to a user that a request is an outlier. In some examples, the user of administrator system 401 may be able to select dots to be presented with more information about (e.g., characteristics of) the DNS request represented by the selected dot.

Referring back to operational scenario 400, after presenting graph 422, DNS resolver 301 receives inspection instruction 423 at step 5. Inspection instruction 423 directs DNS resolver 301 to inspect outlier DNS request 503 shown in graph 422. Administrator system 401 may present its user with an option to request inspection of outliers when presenting graph 422. For example, the user may select the dot representing outlier DNS request 503 from graph 422 and a popup window may appear showing information about outlier DNS request 503 and include a button that the user may select to trigger the inspection. Other mechanisms for triggering inspection instruction 423 may also be used. Upon receiving inspection instruction 423, DNS resolver 301 performs further inspection of outlier DNS request 503, which includes determining a host posture at step 6 for the requesting system of requesting systems 302 from which outlier DNS request 503 originated. In this example, the host posture indicates security features/settings in place at the requesting system. Given that DNS resolver 301 has purview over DNS requests transmitted from the requesting system, DNS resolver 301 also has permission to query the requesting system for its security posture. Preferably, DNS resolver 301 can obtain the host posture of the requesting system at the time outlier DNS request 503 was generated but DNS resolver 301 may have to make do with the current host posture.

Once the host posture of the requesting system has been determined, DNS resolver 301 sends posture report 424 at step 7 to administrator system 401 for presentation to its user. Posture report 424 includes information about the host posture determined at step 6. In some examples, DNS resolver 301 may indicate in posture report 424 items of host posture information that may be anomalous to preventing undesired activity (e.g., may cause activity like that which caused the user of administrator system 401 to initiate outlier request 421). Upon reviewing posture report 424, the user of administrator system 401 can determine whether outlier DNS request 503 is likely to have caused anomalous activity that the user identified. If so, the user can take action to remedy issues that caused the anomalous activity (e.g., direct the requesting system to change its host posture or create a rule in DNS resolver 301 that blocks future requests similar to outlier DNS request 503). If not, the user can move on to investigating other potential causes of the activity.

Figure 6:
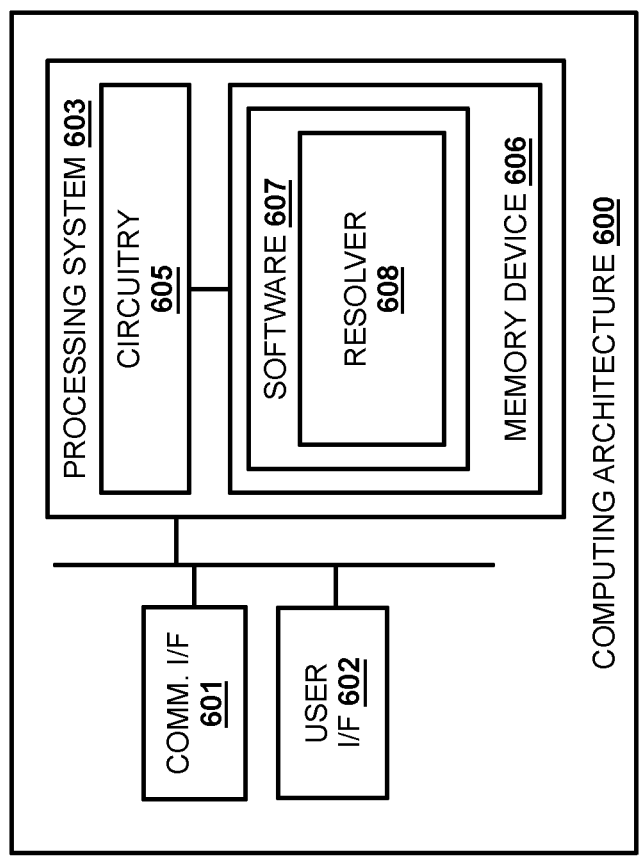
FIG. 6 illustrates a computing architecture for identifying and inspecting outlier DNS requests.

FIG. 6 illustrates computing architecture 600 for identifying and inspecting outlier DNS requests. Computing architecture 600 is an example computing architecture for DNS resolvers 101 and 301, although resolvers 101 and 301 may use alternative configurations. A similar architecture may also be used for other systems described herein (e.g., requesting systems, admin system, nameservers, etc.), although alternative configurations for those systems may also be used. Computing architecture 600 comprises communication interface 601, user interface 602, and processing system 603. Processing system 603 is linked to communication interface 601 and user interface 602. Processing system 603 includes processing circuitry 605 and memory device 606 that stores operating software 607.

Communication interface 601 comprises components that communicate over communication links, such as network cards, ports, RF transceivers, processing circuitry and software, or some other communication devices. Communication interface 601 may be configured to communicate over metallic, wireless, or optical links. Communication interface 601 may be configured to use TDM, IP, Ethernet, optical networking, wireless protocols, communication signaling, or some other communication format-including combinations thereof.

User interface 602 comprises components that interact with a user. User interface 602 may include a keyboard, display screen, mouse, touch pad, or some other user input/output apparatus. User interface 602 may be omitted in some examples.

Processing circuitry 605 comprises microprocessor and other circuitry that retrieves and executes operating software 607 from memory device 606. Memory device 606 comprises a computer readable storage medium, such as a disk drive, flash drive, data storage circuitry, or some other memory apparatus. In no examples would a computer readable storage medium of memory device 606, or any other computer readable storage medium herein, be considered a transitory form of signal transmission (often referred to as "signals per se"), such as a propagating electrical or electromagnetic signal or carrier wave. Operating software 607 comprises computer programs, firmware, or some other form of machine-readable processing instructions. Operating software 607 includes resolver module 608. Operating software 607 may further include an operating system, utilities, drivers, network interfaces, applications, or some other type of software. When executed by processing circuitry 605, operating software 607 directs processing system 603 to operate computing architecture 600 as described herein.

In particular, resolver module 608 directs processing system 603 to determine characteristics of a Domain Name System (DNS) request and generate a score for the DNS request from the characteristics. Resolver module 608 further directs processing system 603 to group a plurality of DNS requests into one or more groups based on a plurality of DNS request scores for the plurality of DNS requests. The plurality of DNS requests occurred in a specified timeframe and include the DNS request. The plurality of DNS request scores includes the score. Also, resolver module 608 directs processing system 603 to, in response to determining the DNS request is an outlier relative to the one or more groups, inspect the DNS request for anomalies.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   determining characteristics of a Domain Name System (DNS) request;
   generating a score for the DNS request from the characteristics;
   grouping a plurality of DNS requests into one or more groups based on a plurality of DNS request scores for the plurality of DNS requests, wherein the plurality of DNS requests occurred in a specified timeframe and include the DNS request, wherein the plurality of DNS request scores includes the score; and
   in response to determining the DNS request is an outlier relative to the one or more groups, inspecting the DNS request for anomalies.

2. The method of claim 1, comprising:
   determining a plurality of characteristics of the plurality of DNS requests; and
   generating the plurality of DNS request scores from the plurality of characteristics.

3. The method of claim 1, wherein inspecting the DNS request comprises:
   determining a host posture for a system that generated the DNS request.

4. The method of claim 1, comprising:
   receiving the specified timeframe from a user.

5. The method of claim 4, wherein the specified timeframe corresponds to a time when malicious activity is thought to have originated.

6. The method of claim 1, wherein the characteristics include one or more from a set comprising:
   a nameserver network address to which the DNS request is directed;
   a first geographic location of a nameserver having the nameserver network address;
   a network address of a system that generated the DNS request;
   a domain name indicated by the DNS request;
   a destination network address resolved in response to the DNS request; and
   a second geographic location of a system having the destination network address.

7. The method of claim 1, comprising:
   receiving the DNS request; and
   transmitting the DNS request to a nameserver for resolution.

8. The method of claim 1, wherein generating the score comprises:
   adjusting a value for the score based on values assigned to each of the characteristics.

9. The method of claim 8, wherein the values correspond to levels of importance of the characteristics relative to each other.

10. An apparatus comprising:
    one or more computer readable storage media;
    a processing system operatively coupled with the one or more computer readable storage media; and
    program instructions stored on the one or more computer readable storage media that, when read and executed by the processing system, direct the apparatus to:
       determine characteristics of a Domain Name System (DNS) request;
       generate a score for the DNS request from the characteristics;
       group a plurality of DNS requests into one or more groups based on a plurality of DNS request scores for the plurality of DNS requests, wherein the plurality of DNS requests occurred in a specified timeframe and include the DNS request, wherein the plurality of DNS request scores includes the score; and
       in response to determining the DNS request is an outlier relative to the one or more groups, inspect the DNS request for anomalies.

11. The apparatus of claim 10, wherein the program instructions direct the apparatus to:
    determine a plurality of characteristics of the plurality of DNS requests; and
    generate the plurality of DNS request scores from the plurality of characteristics.

12. The apparatus of claim 10, wherein to inspect the DNS request, the program instructions direct the apparatus to:
    determine a host posture for a system that generated the DNS request.

13. The apparatus of claim 10, wherein the program instructions direct the apparatus to:
receive the specified timeframe from a user.

14. The apparatus of claim 13, wherein the specified timeframe corresponds to a time when malicious activity is thought to have originated.

15. The apparatus of claim 10, wherein the characteristics include one or more from a set comprising:
a nameserver network address to which the DNS request is directed;
a first geographic location of a nameserver having the nameserver network address;
a network address of a system that generated the DNS request;
a domain name indicated by the DNS request;
a destination network address resolved in response to the DNS request; and
a second geographic location of a system having the destination network address.

16. The apparatus of claim 10, wherein the program instructions direct the apparatus to:
receive the DNS request; and
transmit the DNS request to a nameserver for resolution.

17. The apparatus of claim 10, wherein to generate the score, the program instructions direct the apparatus to:
adjust a value for the score based on values assigned to each of the characteristics.

18. One or more non-transitory computer readable storage media having program instructions stored thereon, the program instructions, when read and executed by a processing system, direct the processing system to:
determine characteristics of a Domain Name System (DNS) request;
generate a score for the DNS request from the characteristics;
group a plurality of DNS requests into one or more groups based on a plurality of DNS request scores for the plurality of DNS requests, wherein the plurality of DNS requests occurred in a specified timeframe and include the DNS request, wherein the plurality of DNS request scores includes the score; and
in response to determining the DNS request is an outlier relative to the one or more groups, inspect the DNS request for anomalies.

\* \* \* \* \*